United States Patent
Kim et al.

(10) Patent No.: US 12,387,492 B2
(45) Date of Patent: Aug. 12, 2025

(54) DIGITAL FORENSIC APPARATUS FOR SEARCHING RECOVERY TARGET AREA FOR LARGE-CAPACITY VIDEO EVIDENCE USING TIME MAP AND METHOD OF OPERATING THE SAME

(71) Applicant: GMDSOFT Inc., Seongnam-si (KR)

(72) Inventors: Hyun Soo Kim, Seongnam-si (KR); Kyung Su Lee, Uiwang-si (KR); Chang Ha Lee, Gunpo-si (KR); Jae Min Jang, Gwangju-si (KR)

(73) Assignee: GMDSOFT INC., Seongnam-si (KR)

( * ) Notice: Subject to any disclaimer, the term of this patent is extended or adjusted under 35 U.S.C. 154(b) by 497 days.

(21) Appl. No.: 17/975,897

(22) Filed: Oct. 28, 2022

(65) Prior Publication Data
US 2023/0343096 A1    Oct. 26, 2023

(30) Foreign Application Priority Data
Apr. 20, 2022  (KR) ........................ 10-2022-0049001

(51) Int. Cl.
*G06V 20/40*   (2022.01)
*G06V 10/62*   (2022.01)
(Continued)

(52) U.S. Cl.
CPC .............. *G06V 20/41* (2022.01); *G06V 10/62* (2022.01); *G06V 10/945* (2022.01); *G06V 20/49* (2022.01);
(Continued)

(58) Field of Classification Search
CPC .. G06V 20/41; G06V 20/49; G06V 30/18181; G06V 10/62; G06V 30/166; G06V 30/1448; G06V 10/945
See application file for complete search history.

(56) References Cited

U.S. PATENT DOCUMENTS

2013/0091432 A1\* 4/2013 Shet .................. G06F 16/73
715/719
2014/0214885 A1\* 7/2014 Park .................. G06F 16/783
707/769
(Continued)

FOREIGN PATENT DOCUMENTS

KR    10-1623321 B1    5/2016
KR    10-1968539 A    4/2019
(Continued)

OTHER PUBLICATIONS

Pyae Phyo Thu et al., "Reconstructing the Path of the Object Based on Time and Date OCR in Surveillance System", International Journal of Trend in Scientific Research and Development, vol. 3, Issue 5, Aug. 2019, e-ISSN: 2456-6470, pp. 2610-2612 (3 pages).

*Primary Examiner* — Syed Haider
(74) *Attorney, Agent, or Firm* — Sughrue Mion, PLLC

(57) ABSTRACT

The present disclosure relates to technology for automatically searching and recovering the recovery area of frames corresponding to a desired time for large-capacity video evidence using a time map generated through an optical character recognition (OCR) function. A digital forensic apparatus for searching and recovering a recovery target area for large-capacity video evidence using a time map according to an embodiment of the present disclosure may include a division recovery device for collecting video evidence from a storage device, dividing the collected video evidence into a plurality of spaces in consideration of the physical space of the storage device, and recovering a representative frame in each of the divided spaces; a time information recognizer for recognizing time information from the recovered representative frame using an optical character recognition (OCR) function; a time map generator for generating a time map in which the divided spaces are arranged according to a time criterion based on the recog-
(Continued)

nized time information; and a selective recovery device for searching a recovery target area by matching specific time information input by a user with the generated time map and recovering the searched recovery target area.

13 Claims, 10 Drawing Sheets

(51) Int. Cl.
*G06V 10/94* (2022.01)
*G06V 30/14* (2022.01)
*G06V 30/166* (2022.01)
*G06V 30/18* (2022.01)

(52) U.S. Cl.
CPC ........ *G06V 30/1448* (2022.01); *G06V 30/166* (2022.01); *G06V 30/18181* (2022.01)

(56) References Cited

U.S. PATENT DOCUMENTS

2016/0350597 A1* 12/2016 Bataller .................. G06T 7/292
2017/0294213 A1* 10/2017 Brauckmann ....... G06F 16/7844
2017/0337426 A1* 11/2017 Werner .................. G06V 20/46

FOREIGN PATENT DOCUMENTS

KR          10-2219250 B1    2/2021
KR      10-2021-0083148 A    7/2021

* cited by examiner

200

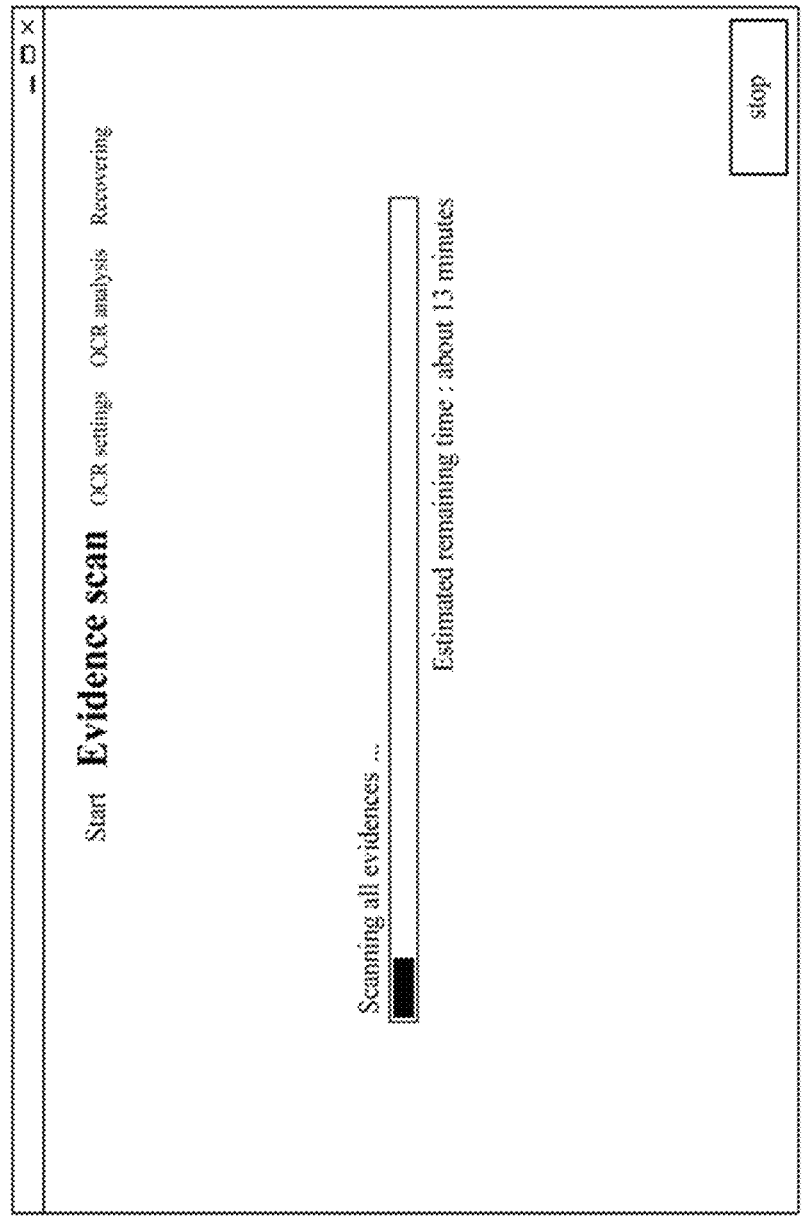

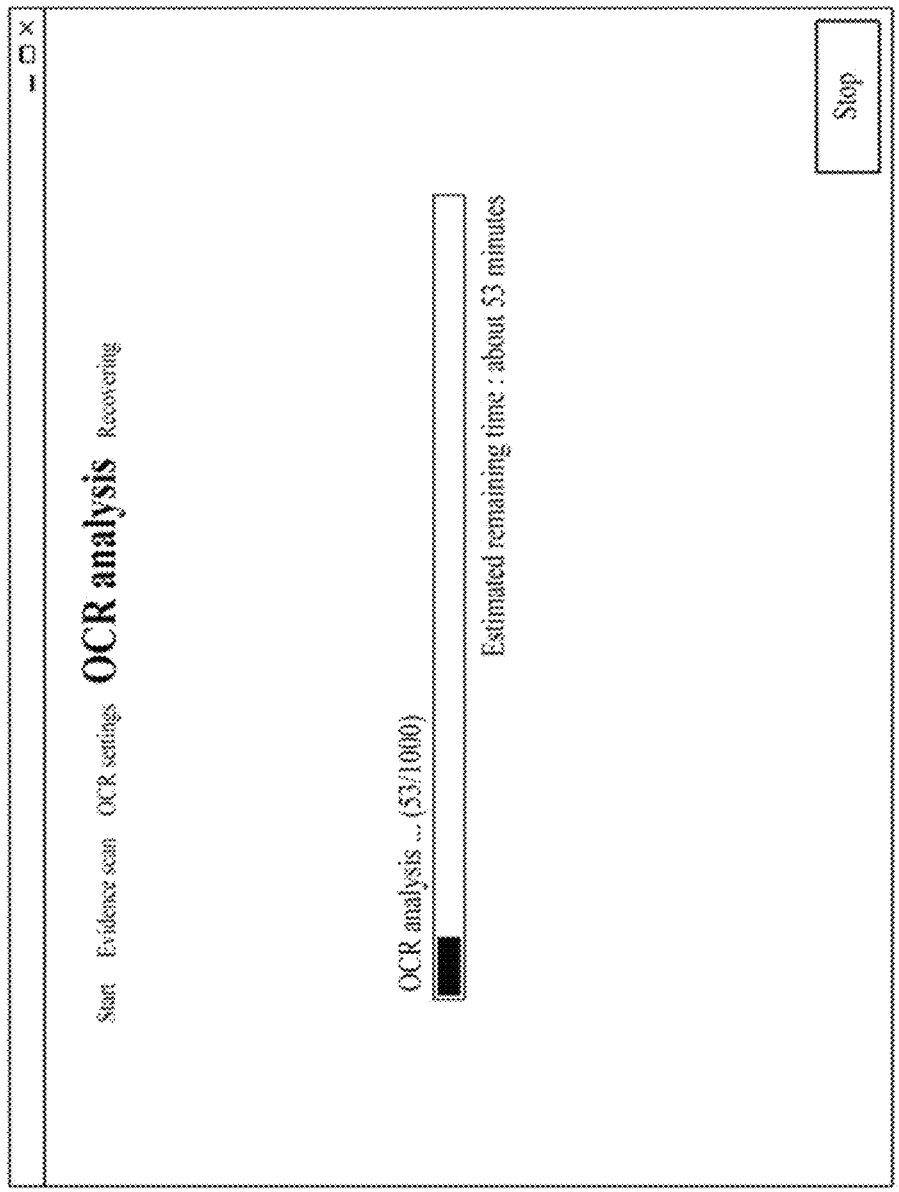

300

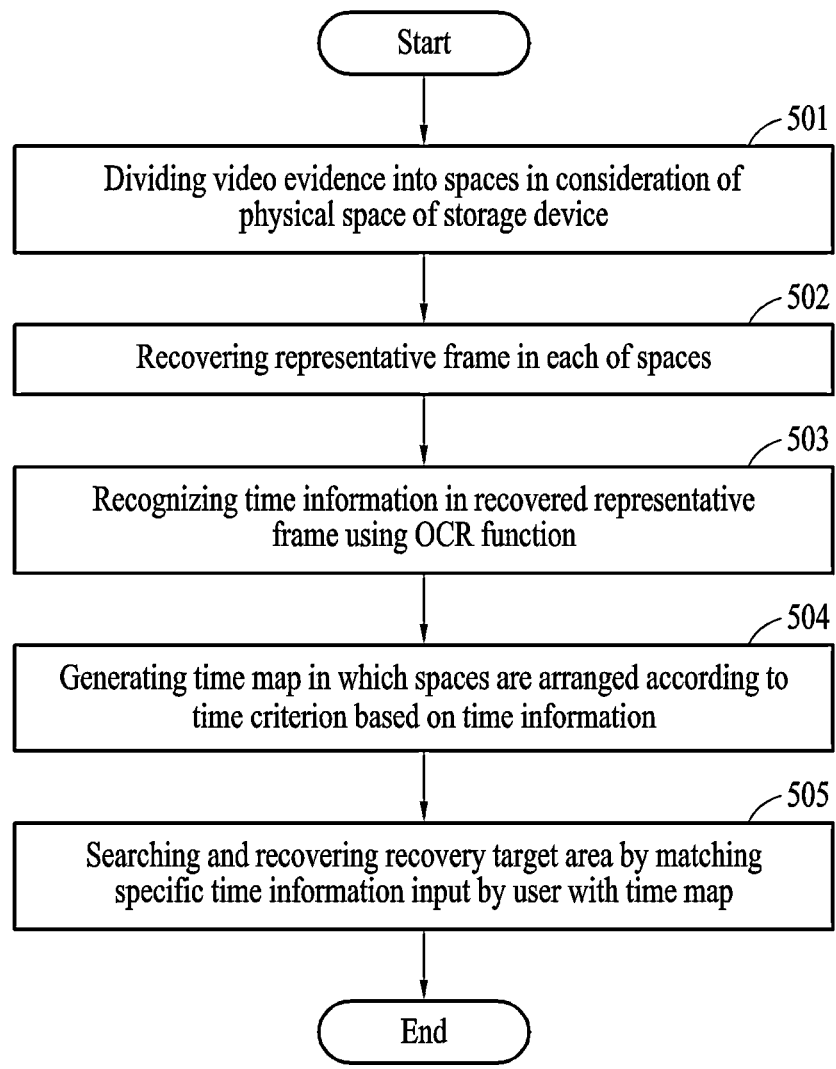

DIGITAL FORENSIC APPARATUS FOR SEARCHING RECOVERY TARGET AREA FOR LARGE-CAPACITY VIDEO EVIDENCE USING TIME MAP AND METHOD OF OPERATING THE SAME

CROSS-REFERENCE TO RELATED APPLICATION

This application claims priority to Korean Patent Application No. 10-2022-0049001, filed on Apr. 20, 2022, in the Korean Intellectual Property Office, the disclosure of which is incorporated herein by reference.

BACKGROUND OF THE DISCLOSURE

Field of the Disclosure

The present disclosure relates to a digital forensic apparatus for searching a recovery target area for large-capacity video evidence using a time map and a method of operating the same, and more particularly, to technology for automatically searching and recovering the recovery area of frames corresponding to a desired time for large-capacity video evidence using a time map generated through an optical character recognition (OCR) function.

Description of the Related Art

Recently, as crimes and accidents increase, there is an increasing need to collect and analyze evidence from devices that can be used as evidence, such as CCTV, dash cams, and mobile phones.

On the one hand, due to increase in the capacity of a storage medium, recording time and capacity are also increasing.

In particular, CCTV videos, which are frequently used as evidence, can contain data from a minimum of several days to a maximum of several months depending on resolution and the capacity of a storage medium.

These large-capacity videos basically contain information about millions of key frame images. When detailed frame images are considered, the number of frames to be analyzed increases several times or tens of times.

In an environment for forensic analysis related to videos, frame images related to events should be searched quickly and accurately.

However, when a person checks millions of frame images one by one, considerable labor and time are consumed, and thus detection efficiency is significantly reduced.

In addition, since a video is composed of very similar continuous frame images, there is a problem in that unnecessary image search work is increased.

In the related art, a method of checking the entire video or a method of directly recovering and checking video frames and frame images was used.

Accordingly, in the case of the conventional methods, time required for checking is increased. As a result, time required to analyze digital evidence for important events is significantly increased, which delays solution of the events.

In addition, in digital evidence analysis, identifying the exact event time is an important factor. Thus, a time factor must be considered. However, in the related art, the user's convenience is deteriorated because a time factor is not considered.

SUMMARY OF THE DISCLOSURE

Therefore, the present disclosure has been made in view of the above problems, and it is an object of the present disclosure to automatically search and recover the recovery area of frames corresponding to a desired time for large-capacity video evidence using a time map generated through an optical character recognition (OCR) function.

It is another object of the present disclosure to provide a recovery result quickly by selecting only a part of a space from large-capacity video evidence stored in a mass-storage device simply by inputting a desired time by a user.

It is yet another object of the present disclosure to improve the efficiency of digital forensics by allowing a user to select a recovery target area by inputting a desired time, enabling additional confirmation of an adjacent sector based on the physical address of the selected recovery target area, and enabling additional analysis and confirmation of the relationship between time and physical arrangement.

In accordance with one aspect of the present disclosure, provided is a digital forensic apparatus for searching and recovering a recovery target area for large-capacity video evidence using a time map, the digital forensic apparatus including a division recovery device for collecting video evidence from a storage device, dividing the collected video evidence into a plurality of spaces in consideration of a physical space of the storage device, and recovering a representative frame in each of the divided spaces; a time information recognizer for recognizing time information from the recovered representative frame using an optical character recognition (OCR) function; a time map generator for generating a time map in which the divided spaces are arranged according to a time criterion based on the recognized time information; and a selective recovery device for searching a recovery target area by matching specific time information input by a user with the generated time map and recovering the searched recovery target area.

The division recovery device may divide the collected video evidence into the spaces by applying a predetermined size or ratio with respect to a total size of the physical space and recover a first frame existing at a front in each of the divided spaces as the representative frame.

The time information recognizer may position a recognition box in an area corresponding to the time information in the recovered representative frame, extract numeric features from the positioned recognition box, and recognize the time information according to numbers classified according to the extracted numeric features.

The time information recognizer may convert a size of an image recognized through the recognition box, normalize pixel values of the image, extract numeric features from the image, classify the image numerically using the extracted numeric features, and recognize the time information according to the extracted number by performing time value verification on the classified number.

The time information recognizer may classify the recognition box by time units including year, month, day, hour, minute, and second and recognize the time information according to the classified number in the classified time units.

The time map generator may determine a time distribution in the physical space based on the time information and generate the time map by arranging, on a timeline, any one of the determined time distribution and physical addresses and representative frames of the divided spaces according to the time criterion corresponding to a time sequence.

The time map generator may generate, for each specific time on the timeline, the time map as a graph showing change in the number of frames included in a recovery area corresponding to the specific time.

The selective recovery device may determine a list of a plurality of frames included in the searched recovery target area and recover at least one frame selected from the determined list.

The selective recovery device may provide a preview of at least one frame included in an adjacent sector based on a physical address of the searched recovery target area.

The digital forensic apparatus may further include a user interface for providing images and list of frames in the recovery target area to be recovered, providing an input interface for the specific time information, and providing a control interface for a recognition box associated with the OCR function.

In accordance with another aspect of the present disclosure, provided is a method of operating a digital forensic apparatus for searching and recovering a recovery target area for large-capacity video evidence using a time map, the method including, by a division recovery device, collecting video evidence from a storage device, dividing the collected video evidence into a plurality of spaces in consideration of a physical space of the storage device, and recovering a representative frame in each of the divided spaces; recognizing, by a time information recognizer, time information from the recovered representative frame using an optical character recognition (OCR) function; generating, by a time map generator, a time map in which the divided spaces are arranged according to a time criterion based on the recognized time information; and by a selective recovery device, searching a recovery target area by matching specific time information input by a user with the generated time map and recovering the searched recovery target area.

The dividing of the collected video evidence into a plurality of spaces in consideration of a physical space of the storage device and the recovering of a representative frame in each of the divided spaces may include dividing the collected video evidence into the spaces by applying a predetermined size or ratio with respect to a total size of the physical space and recovering a first frame existing at a front in each of the divided spaces as the representative frame.

The recognizing of time information from the recovered representative frame using an optical character recognition (OCR) function may include positioning a recognition box in an area corresponding to the time information in the recovered representative frame; converting a size of an image recognized through the recognition box, normalizing pixel values of the image, and extracting numeric features from the image; classifying the image numerically using the extracted numeric features; and recognizing the time information according to the extracted number by performing time value verification on the classified number.

The converting of a size of an image recognized through the recognition box, the normalizing of pixel values of the image, and the extracting of numeric features from the image may include separating the recognition box by time units including year, month, day, hour, minute, and second.

The recognizing of the time information according to the extracted number by performing time value verification on the classified number may include recognizing the time information according to the classified number in the classified time units.

The generating of a time map in which the divided spaces are arranged according to a time criterion based on the recognized time information may include determining a time distribution in the physical space based on the time information and generating the time map by arranging, on a timeline, any one of the determined time distribution and physical addresses and representative frames of the divided spaces according to the time criterion corresponding to a time sequence.

The searching of a recovery target area by matching specific time information input by a user with the generated time map and the recovering of the searched recovery target area may include, by the selective recovery device, determining a list of a plurality of frames included in the searched recovery target area and recovering at least one frame selected from the determined list; and providing a preview of at least one frame included in an adjacent sector based on a physical address of the searched recovery target area.

BRIEF DESCRIPTION OF THE DRAWINGS

The above and other objects, features and other advantages of the present disclosure will be more clearly understood from the following detailed description taken in conjunction with the accompanying drawings, in which:

FIGS. 2A to 2E are drawings for explaining the user interface of a digital forensic apparatus according to an embodiment of the present disclosure;

FIG. 5 is a flowchart for explaining a method of operating a digital forensic apparatus according to an embodiment of the present disclosure.

DETAILED DESCRIPTION OF THE DISCLOSURE

Figure 1:
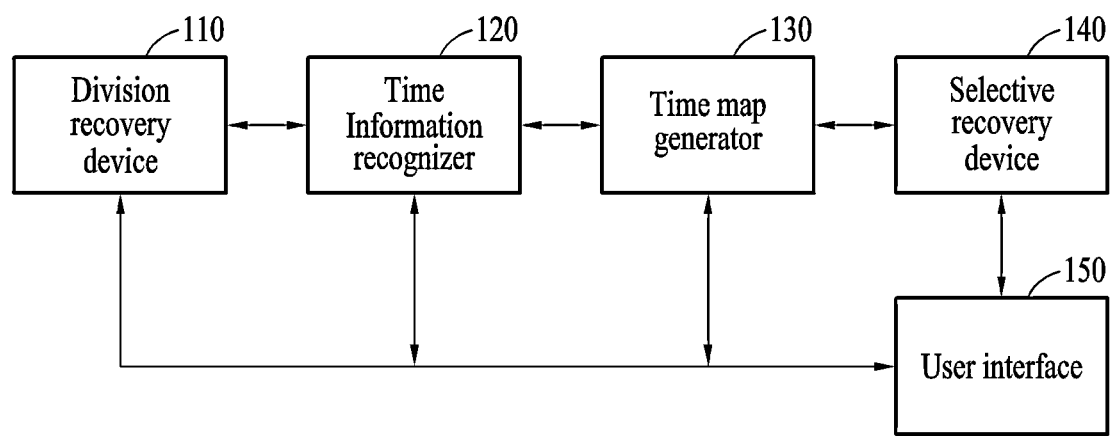
FIG. 1 is a block diagram for explaining a digital forensic apparatus according to an embodiment of the present disclosure.

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used for explaining a specific exemplary embodiment, not limiting the present inventive concept. Thus, the expression of singularity in the present specification includes the expression of plurality unless clearly specified otherwise in context. Also, the terms such as "include" or "comprise" are used to specify stated characteristics, numbers, steps, operations, constituent elements, or a combination thereof, but should not be construed to exclude the existence of or a possibility of addition of one or more other characteristics, numbers, steps, operations, constituent elements, or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

FIG. 1 is a block diagram for explaining a digital forensic apparatus according to an embodiment of the present disclosure.

FIG. 1 shows an example of the components of a digital forensic apparatus for searching and recovering a recovery target area for large-capacity video evidence using a time map according to one embodiment of the present disclosure.

Referring to FIG. 1, a digital forensic apparatus 100 according to an embodiment of the present disclosure includes a division recovery device 110, a time information recognizer 120, a time map generator 130, and a selective recovery device 140.

For example, the division recovery device 110, the time information recognizer 120, the time map generator 130, and the selective recovery device 140 may be functional or software components that are driven by the processor of the digital forensic apparatus 100.

That is, the technical characteristics of the division recovery device 110, the time information recognizer 120, the time map generator 130, and the selective recovery device 140 may be implemented by a processor. For example, the processor may be referred to as a controller.

According to one embodiment of the present disclosure, the digital forensic apparatus 100 further includes a user interface 150.

The user interface 150 includes a control interface and a display interface displayed through a display.

According to one embodiment of the present disclosure, the division recovery device 110 may collect video evidence from a storage device, divide the collected video evidence into a plurality of spaces in consideration of the physical space of the storage device, and recover a representative frame in each of the divided spaces.

For example, the division recovery device 110 may divide video evidence into a plurality of spaces by applying a predetermined size or ratio with respect to the total size of a physical space and recover a first frame existing at the front in each of the divided spaces as a representative frame.

For example, the division recovery device 110 may collect large-capacity video evidence stored in a storage device, and may confirm the total size of the physical space of a storage device while collecting the large-capacity video evidence.

Accordingly, the division recovery device 110 may divide large-capacity video evidence into a plurality of spaces in a predetermined size or ratio in consideration of the total size of a physical space for the large-capacity video evidence stored in a storage device.

For example, a plurality of spaces may include a plurality of frames, and the frames may exist sequentially. In the frames, a frame existing at the front may be restored as a representative frame.

That is, the division recovery device 110 recovers a representative frame in each of a plurality of spaces.

According to one embodiment of the present disclosure, the time information recognizer 120 recognizes, using an optical character recognition (OCR) function, time information in a representative frame recovered by the division recovery device 110.

For example, a representative frame included in each of a plurality of spaces may display time information at the same position, and the displayed time information may be recognized using an OCR function.

According to one embodiment of the present disclosure, the time information recognizer 120 may position a recognition box in an area corresponding to time information in a representative frame recovered by the division recovery device 110, extract numeric features from the positioned recognition box, and recognize time information according to numbers classified according to extracted numeric features.

Here, generation of the recognition box and control of the position of the recognition box may be implemented by a user through the user interface 150.

For example, the time information recognizer 120 may convert the size of an image recognized through the recognition box, normalize the pixel values of the image, and extract numeric features from the image.

In addition, the time information recognizer 120 may classify an image numerically by using the extracted numeric features, perform time value verification on the classified number, and recognize time information according to the extracted number.

According to one embodiment of the present disclosure, the time information recognizer 120 may read time information from a representative frame by using an OCR function and recognize the time information read by using the OCR function as a time period in which data is written in a corresponding area.

For example, the time information recognizer 120 may operate by being divided into a pre-processing model, a number classification model, and a post-processing model.

Since the pre-processing model needs to change a numeric image into a predefined form to use an artificial neural network, the pre-processing model may involve transforming the image and normalizing various pixel values between 0 and 255 to values between 0 and 1.

The number classification model may be composed of an extraction network for extracting numeric features required for classification of numbers and a classification network for classifying images into numbers between 0 and 9 using the extracted numeric features.

For example, the extraction network may use Resnet34 as a neural network model, and the classification network may use multi-layer perceptron (MLP) as a neural network model.

The post-processing model may be related to an operation of filtering out errors that may occur in a classification model by performing time value verification to improve the reliability of OCR results.

For example, the post-processing model may perform time value verification for time when an error is detected due to a light background color.

That is, the post-processing model performs a verification operation of once again confirming whether time information recognized by the pre-processing model and the number classification model is accurate.

According to one embodiment of the present disclosure, the time information recognizer 120 may classify the recognition box by time units including year, month, day, hour, minute, and second and recognize time information according to numbers classified according to the classified time units.

For example, when a number recognized by a year recognition box is 2015, the number may be recognized as the year 2015. When a number recognized by a month recognition box is 11, the number may be recognized as November.

An embodiment in which the time information recognizer 120 recognizes time information according to a time format will be described with reference to FIGS. 3A and 3B.

According to one embodiment of the present disclosure, based on time information recognized by the time information recognizer 120, the time map generator 130 may generate a time map in which a plurality of spaces divided by the division recovery device 110 is arranged according to time criterion.

For example, the time map generator 130 may determine a time distribution in the physical space of a storage device based on time information and generate a time map by arranging, on a timeline, any one of the time distribution and the physical addresses and representative frames of the divided spaces determined according to a time criterion corresponding to a time sequence.

According to one embodiment of the present disclosure, the time map generator 130 may generate, for each specific time on a timeline, a time map as a graph showing change in the number of frames included in a recovery area corresponding to the specific time.

For example, the specific time may be a time divided according to the physical addresses of a plurality of divided spaces.

A plurality of spaces equally divided by physical space may be divided by the same amount of time in terms of time.

For example, the spaces of a first recovery area and a second recovery area occupied by a time of 10 minutes may be the same. However, the number of frames stored in 10 minutes may vary.

Accordingly, when the number of frames included in the first recovery area is 3, the number of frames included in the second recovery area may be 6.

A time map generated according to an embodiment of the present disclosure will be further described with reference to FIG. 4.

According to one embodiment of the present disclosure, the selective recovery device 140 may search a recovery target area by matching specific time information input by a user with a time map generated by the time map generator 130 and recover the searched recovery target area.

For example, the selective recovery device 140 may determine a list of a plurality of frames included in the searched recovery target area and recover at least one frame selected from the determined list.

In addition, the selective recovery device 140 may recover a specific frame corresponding to specific time information input by a user in a list of a plurality of frames included in the searched recovery target area.

That is, the selective recovery device 140 may recover at least one frame according to the size or range of specific time information.

For example, the size or range of specific time information may be a specific time point corresponding to 11:52:10 on Apr. 6, 2022, or may range from a start point (11:52:10 on Apr. 5, 2022) to an end point (11:52:10 on Apr. 6, 2022).

For example, the selective recovery device 140 may provide a preview of at least one frame included in an adjacent sector based on the physical address of the searched recovery target area.

According to one embodiment of the present disclosure, to search at least one frame corresponding to time information input by a user, the selective recovery device 140 automatically calculates a specific area in the entire space of a storage device by mapping the time information input by the user to a pre-generated time map and may selectively recover a frame in the searched specific area.

According to one embodiment of the present disclosure, the user interface 150 may provide images and lists for frames in a recovery target area.

In addition, the user interface 150 may provide an input interface for specific time information and a control interface for a recognition box associated with an OCR function.

For example, the user interface 150 may encompass a user interface accessible to a user in relation to data input to a digital forensic apparatus and may relate to data output or displayed in the digital forensic apparatus.

According to one embodiment of the present disclosure, the digital forensic apparatus 100 may generate a time map through OCR and search, by using the generated time map, a recovery target area included in a frame corresponding to specific time that a user wants to search.

Accordingly, the present disclosure may automatically search and recover the recovery area of frames corresponding to a desired time for large-capacity video evidence using a time map generated through an optical character recognition (OCR) function.

FIGS. 2A to 2E are drawings for explaining the user interface of a digital forensic apparatus according to an embodiment of the present disclosure.

FIGS. 2A to 2E show a screen configuration, as a user interface, provided by a digital forensic apparatus according to an embodiment of the present disclosure.

Figure 2A:
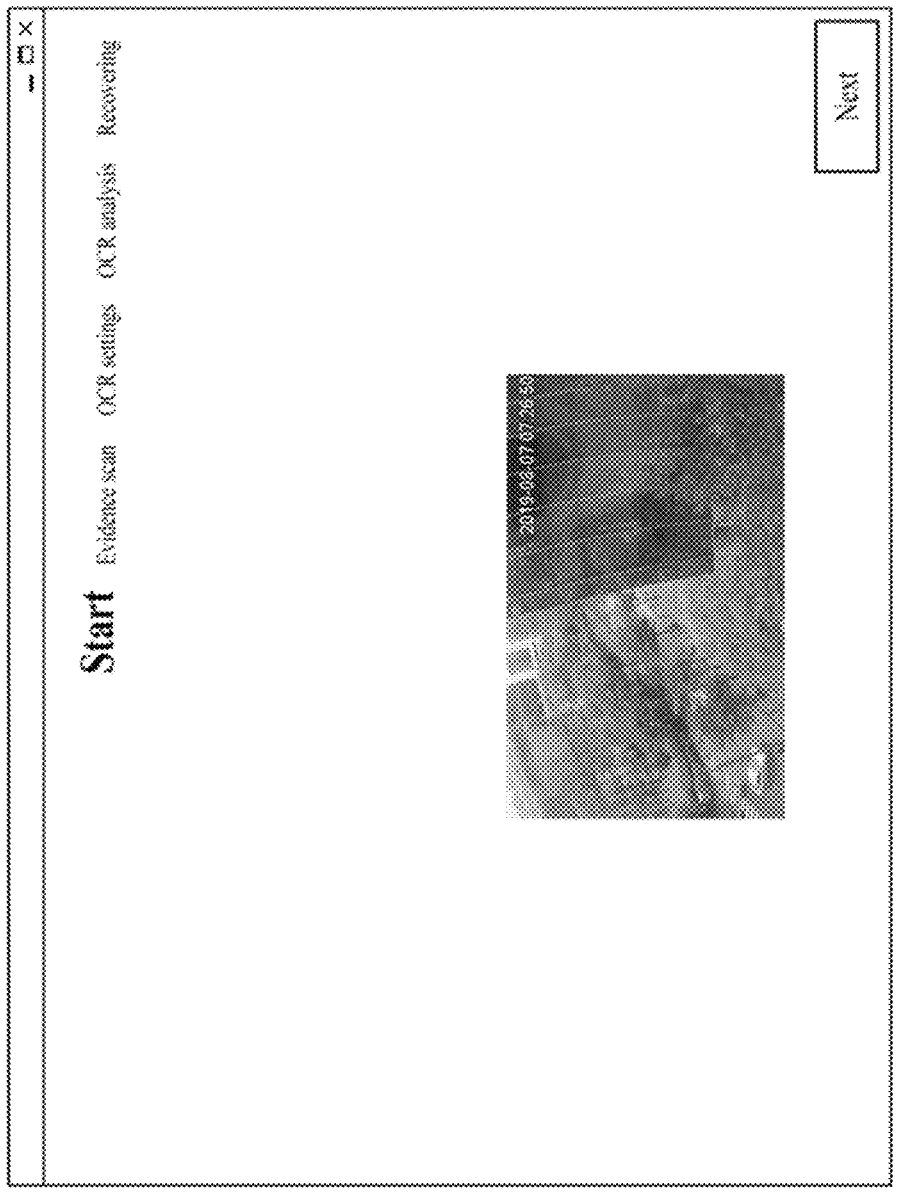

Referring to FIG. 2A, the digital forensic apparatus according to an embodiment of the present disclosure displays a start screen 200.

The start screen 200 may display an image of a frame that may be selected and provided by a storage device and an interface for proceeding to the next step.

Referring to FIG. 2B, the digital forensic apparatus according to an embodiment of the present disclosure displays an evidence scan screen 210.

The evidence scan screen 210 displays a process of scanning video evidence in a storage device serving as evidence.

For example, the evidence scan screen 210 supports a user to check an evidence scan process at a glance by providing elapsed scan time and expected scan time.

In the evidence scan process, a physical space in a storage device may be identified, the space may be divided into a plurality of spaces based on the identified physical space, and a representative frame may be recovered in each of the divided spaces.

Figure 2C:
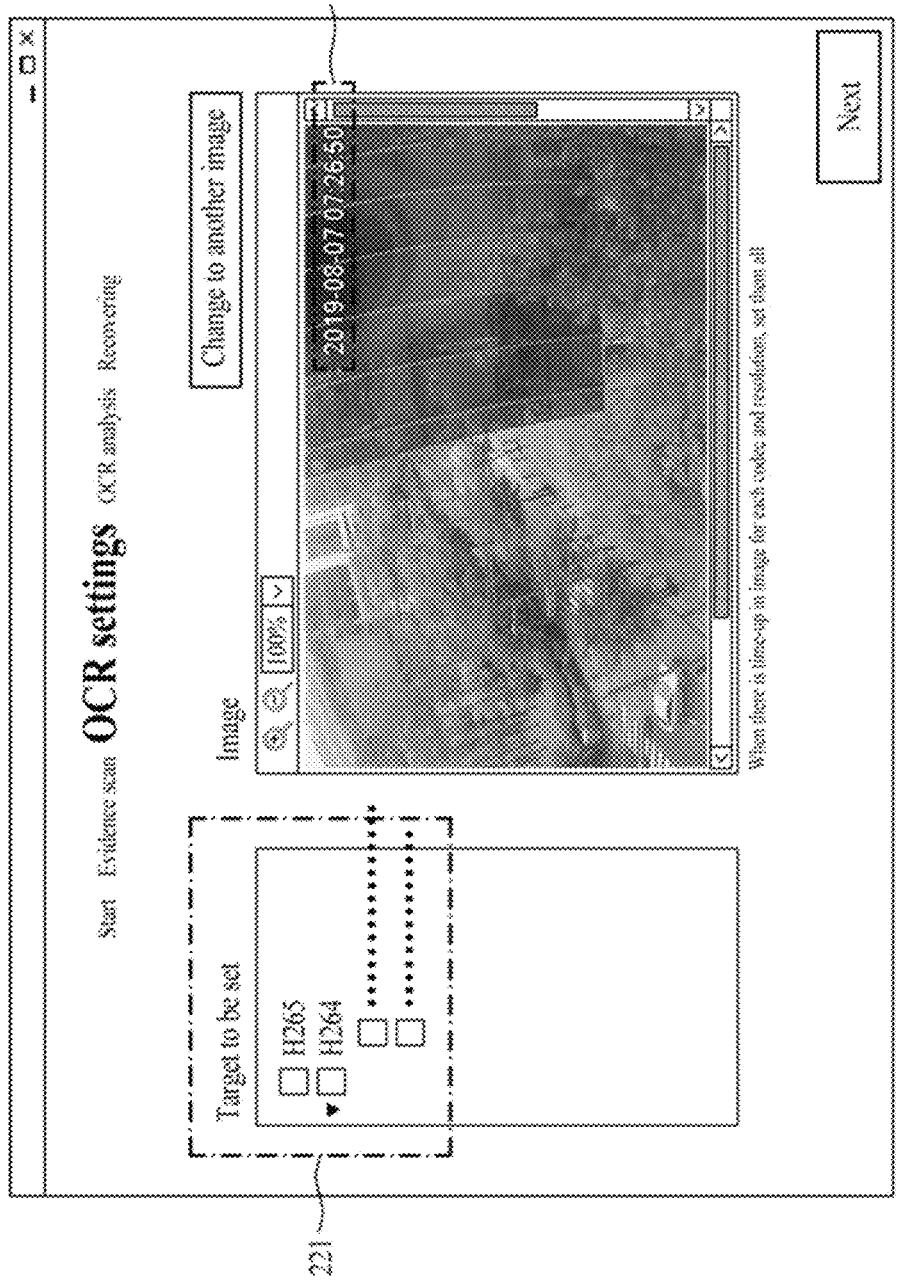

Referring to FIG. 2C, the digital forensic apparatus according to an embodiment of the present disclosure displays an OCR setting screen 220.

The OCR setting screen 220 displays a recognition box 222 for recognizing time information on a representative frame by providing a setting tab 221 for setting OCR for the type and resolution of each of codecs existing in an image and an image of the representative frame.

The position of the recognition box 222 may be controlled to select an area of time information present on the representative frame.

In addition, the setting tab 221 may support to improve the accuracy of OCR function implementation as a user sets the type and resolution of the codec of the representative frame.

Referring to FIG. 2D, the digital forensic apparatus according to an embodiment of the present disclosure displays an OCR analysis screen 230.

The OCR analysis screen 230 displays a process of recognizing time information based on a recognition box in a representative frame.

For example, the OCR analysis screen 230 supports a user to check an OCR analysis process at a glance by providing elapsed OCR analysis time and expected OCR analysis time.

In addition, the digital forensic apparatus recognizes time information based on OCR recognition in an OCR analysis process and generates a time map based on the recognized time information.

Figure 2E:
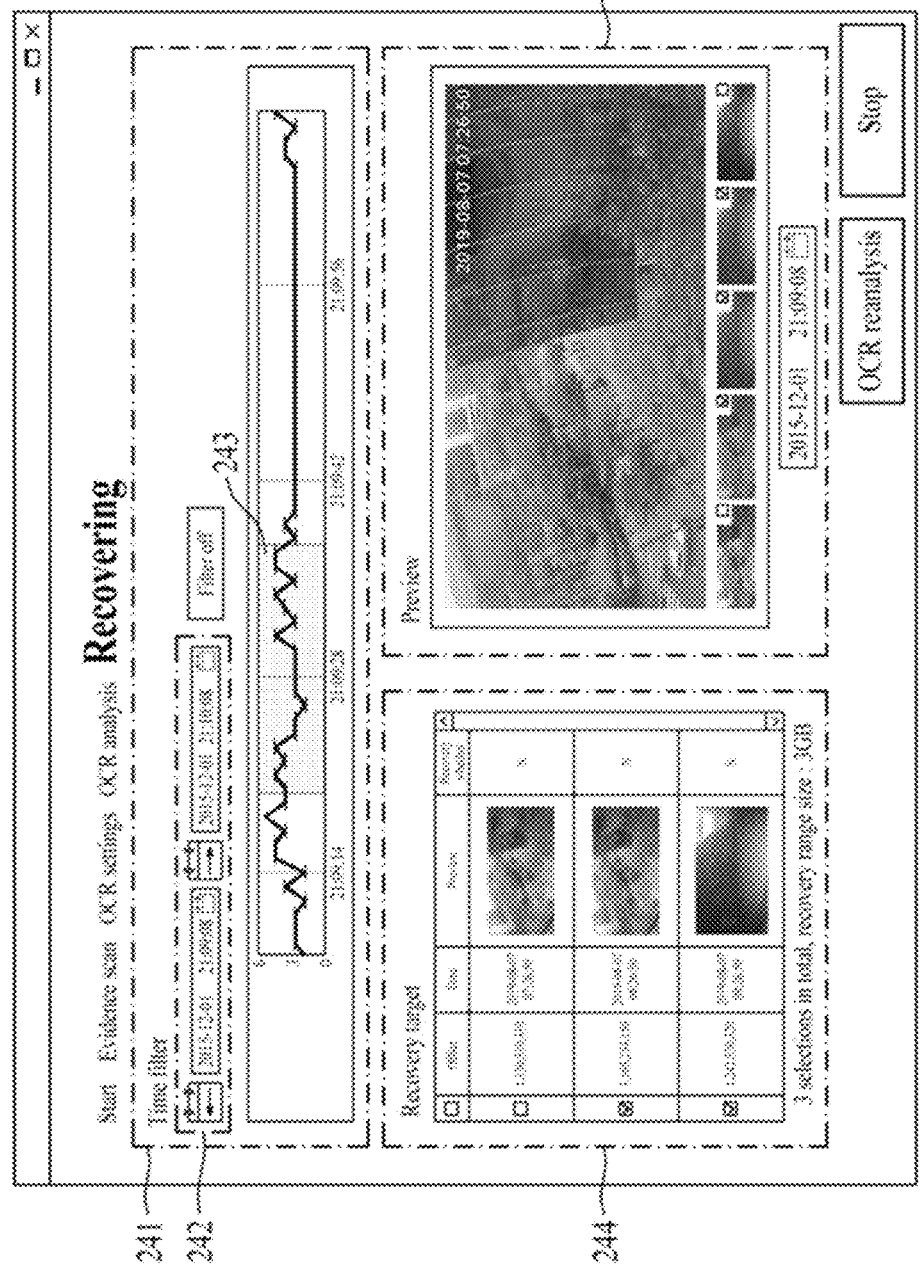

Referring to FIG. 2E, the digital forensic apparatus according to an embodiment of the present disclosure displays a selective recovery screen 240.

The selective recovery screen 240 provides an input interface 241 through which a user inputs specific time information, a list display interface 244, and a preview interface 245.

The input interface 241 includes a time filter interface 242 for inputting a time range corresponding to a recovery target area that a user wants to search.

In addition, the input interface 241 includes an interface for displaying a range 243 on a time map corresponding to specific time information input through the time filter interface 242.

For example, the time map may divide and display a plurality of spaces according to time at which the spaces are divided, and may show the number of frames included in each of the displayed spaces.

For example, the time map is in the form of a graph, and the vertical axis represents the number of frames, and the horizontal axis represents time information in which a plurality of spaces are divided on the time map.

A list of frames included in a recovery area set through the time filter interface 242 is displayed on the list display interface 244, and a preview image of a specific frame selected from the list is displayed through the preview interface 245.

Accordingly, the present disclosure may provide a recovery result quickly by selecting only a part of a space from large-capacity video evidence stored in a mass-storage device simply by inputting a desired time by a user.

Figure 3A:
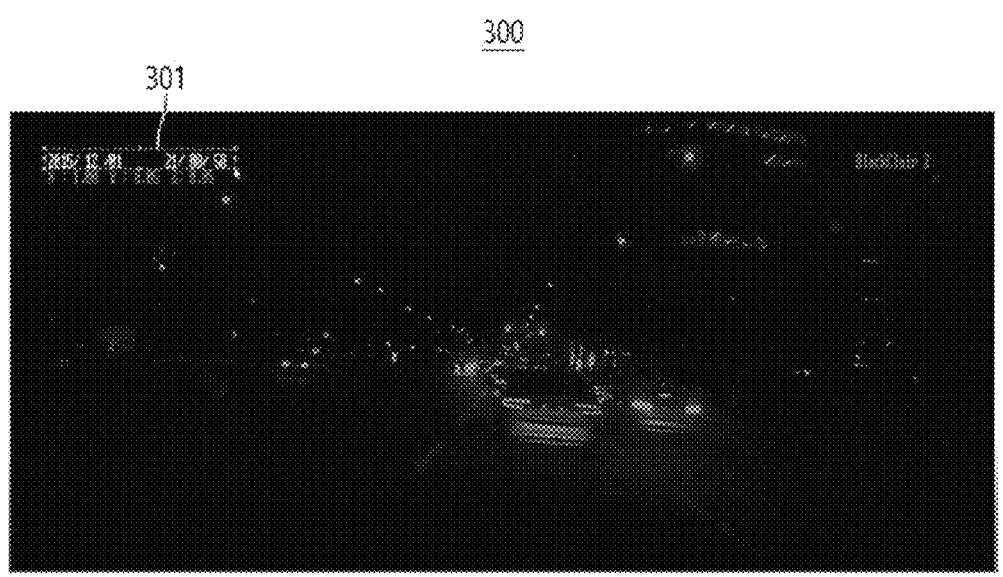
FIGS. 3A and 3B are drawings for explaining a user interface for time information recognition in a digital forensic apparatus according to an embodiment of the present disclosure.
Figure 3B:
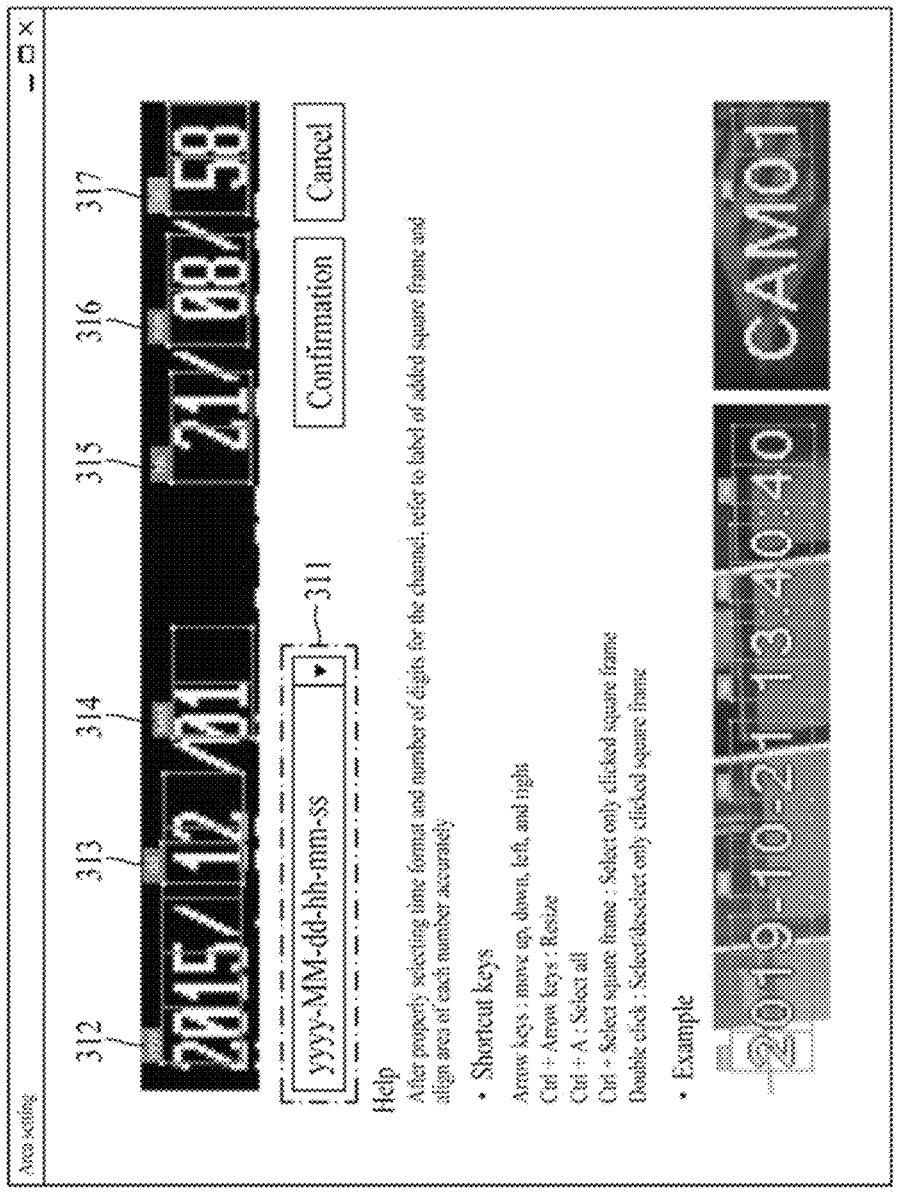

FIGS. 3A and 3B are drawings for explaining a user interface for time information recognition in a digital forensic apparatus according to an embodiment of the present disclosure.

FIG. 3A shows an example of a configuration in which a position of a recognition box for displaying a representative frame and recognizing time information in the displayed representative frame is controlled in the digital forensic apparatus according to an embodiment of the present disclosure.

Referring to FIG. 3A, the digital forensic apparatus collects large-capacity image evidence from a storage device, divides the collected large-capacity image evidence into a plurality of spaces, and displays a representative frame 300 positioned at the front in any one of the divided spaces.

In the upper left corner of the representative frame 300, a character indicating time information is displayed, and the position of a recognition box 301 is moved by a user to apply an OCR function to the representative frame 300.

When the recognition box 301 determines a character representing time information in the representative frame 300, the window is moved to the pop-up window of FIG. 3B.

FIG. 3B shows an example of a configuration in which the position of a recognition box is controlled, and then a pop-up window is provided for setting a time format and the positional numbers of channels in the digital forensic apparatus according to an embodiment of the present disclosure.

Referring to FIG. 3B, an interface 311 and recognition boxes 312 to 317 for controlling a time format in a pop-up window 310 are illustrated.

The interface 311 supports control for determining a time format recognized by the recognition boxes 312 to 317.

When a user selects "yyyy-MM-dd-hh-mm-ss" through the interface 311, the recognition box 312 recognizes "yyyy", the recognition box 313 recognizes "MM", the recognition box 314 recognizes "dd", the recognition box 315 recognizes "hh", the recognition box 316 recognizes "mm", and the recognition box 317 recognizes "ss".

Accordingly, the digital forensic apparatus may improve the recognition accuracy of time information by selecting a position where the time information is positioned in a video and designating and recognizing the order in which the time information is displayed at the selected position.

The recognition boxes 312 to 317 may improve the recognition accuracy of time information as a position may be flexibly adjusted on an image of the time information to be recognized.

For example, the recognition box 312 recognizes the year 2015 based on "yyyy", the recognition box 313 recognizes December based on "MM", the recognition box 314 recognizes the day 1 based on "dd", the recognition box 315 recognizes 21 o'clock based on "hh", the recognition box 316 recognizes 8 minutes based on "mm", and the recognition box 317 recognizes 58 seconds based on "ss".

According to one embodiment of the present disclosure, the digital forensic apparatus may recognize a number based on an image recognized in a representative frame recognized using a recognition box and recognize a time distribution of the representative frame by recognizing time information based on the number.

Figure 4:
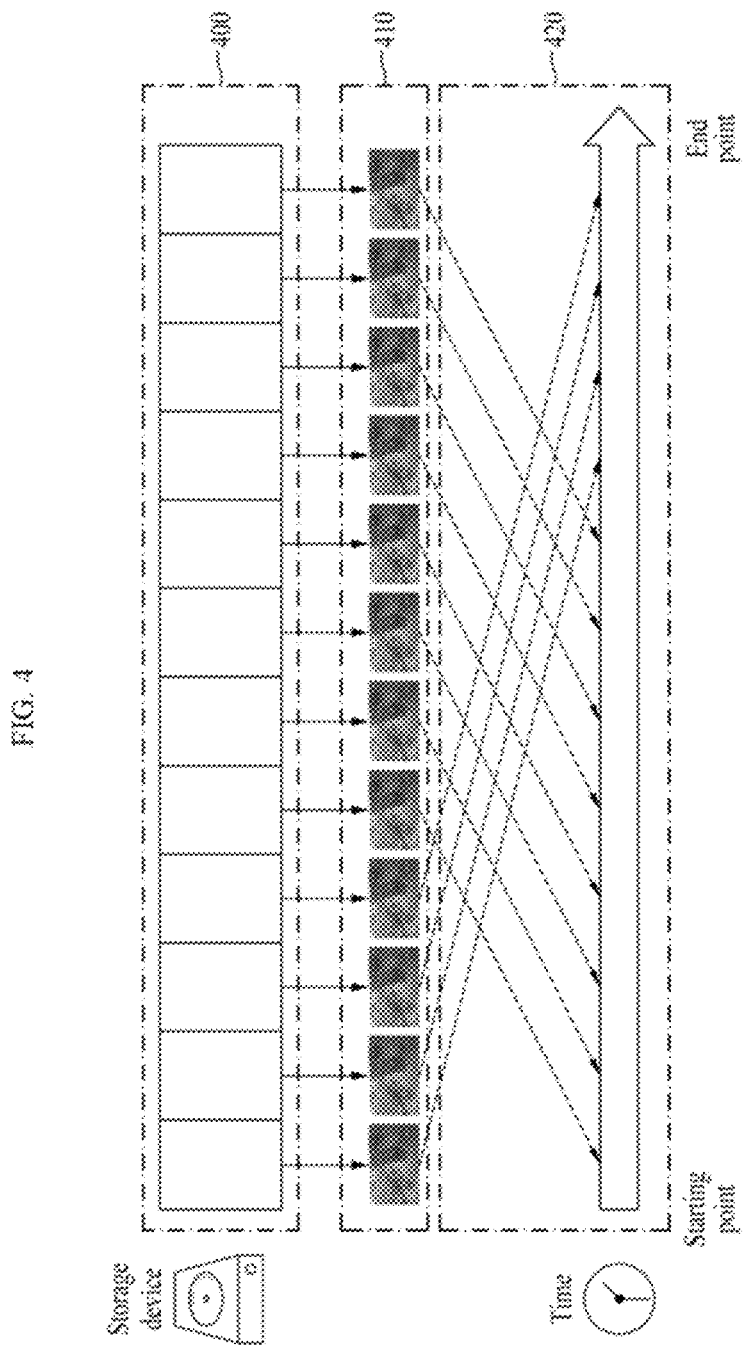
FIG. 4 is a drawing for explaining a time map generated by a digital forensic apparatus according to an embodiment of the present disclosure.

FIG. 4 is a drawing for explaining a time map generated by a digital forensic apparatus according to an embodiment of the present disclosure.

FIG. 4 illustrates the configuration and form of a time map generated by the digital forensic apparatus according to an embodiment of the present disclosure.

Referring to FIG. 4, a time map 420 according to one embodiment of the present disclosure has a form based on a time distribution from a start point to an end point at which video evidence is recorded in a storage device in which a representative frame 410 or the physical address of the storage device corresponding to the representative frame is recorded.

After the physical space of a storage device is divided into a plurality of spaces 400, the representative frame 410 is first located and recovered in each of the spaces 400.

The time map 420 has a structure in which a storage time distribution of data stored on the physical address (offset) of a storage device is obtained through time information recognized in the representative frame 410 and the physical address of the storage device and time are mapped using the obtained distribution.

In the time map 420, the entire physical storage space of a storage device may be arranged according to a time criterion, and the time map 420 is used to easily search for a space for a recovery target area in which a frame of a desired time exists.

For example, a user may easily search the corresponding recovery target area by inputting only time information corresponding to a frame to be restored, and may recover the frame included in the searched recovery target area.

That is, the digital forensic apparatus may provide a recovery result to a user quickly by selecting only a part of the entire space of a storage device using the time map 420.

In addition, the digital forensic apparatus additionally provides an adjacent sector of a recovery target area based on the physical address of the recovery target area based on specific time information input by a user.

Accordingly, analysis efficiency for video evidence may be improved by additionally confirming and analyzing the relationship between time and physical arrangement of a recovery target area that a user wants to search.

Accordingly, the present disclosure may improve the efficiency of digital forensics by allowing a user to select a recovery target area by inputting a desired time, enabling additional confirmation of an adjacent sector based on the physical address of the selected recovery target area, and enabling additional analysis and confirmation of the relationship between time and physical arrangement.

FIG. 5 is a flowchart for explaining a method of operating a digital forensic apparatus according to an embodiment of the present disclosure.

FIG. 5 shows a method of operating a digital forensic apparatus for searching and recovering a recovery target area for large-capacity video evidence using a time map according to one embodiment of the present disclosure.

Referring to FIG. 5, according to the method of operating a digital forensic apparatus, in step 501, video evidence is divided into a plurality of spaces in consideration of the physical space of a storage device.

That is, according to the method of operating a digital forensic apparatus, video evidence may be collected from the storage device to be analyzed, and the physical space of the storage device may be divided into a plurality of spaces so that the collected video evidence is divided into a plurality of spaces in consideration of the physical space of the storage device.

According to the method of operating a digital forensic apparatus, in step 502, a representative frame is recovered in each of the spaces.

That is, according to the method of operating a digital forensic apparatus, a first frame existing at the front in each of the spaces divided in step 501 may be recovered as a representative frame.

For example, according to the method of operating a digital forensic apparatus, a frame recognized as being positioned at the front in each of the spaces may be selected as a representative frame.

According to the method of operating a digital forensic apparatus, in step 503, time information is recognized in the recovered representative frame using an OCR function.

That is, according to the method of operating a digital forensic apparatus, in step 502, in the recovered representative frame, a recognition box for applying an OCR function may be positioned in an area corresponding to time information, numeric features may be extracted from the positioned recognition box, and time information of the recovered representative frame may be recognized based on numbers classified according to the extracted numeric features.

Accordingly, according to the method of operating a digital forensic apparatus, the time distribution of each of a plurality of spaces may be recognized based on the time information of a representative frame.

According to the method of operating a digital forensic apparatus, in step 504, a time map in which a plurality of spaces is arranged according to a time criterion based on time information is generated.

That is, in the method of operating a digital forensic apparatus, a time distribution in a physical space may be determined based on time information, and a time map may be generated by arranging, on a timeline, any one of the time distribution and the physical addresses and representative frames of the divided spaces determined according to a time criterion corresponding to a time sequence.

For example, based on an input for specific time, the time map may support selection of a recovery area corresponding to the specific time.

According to the method of operating a digital forensic apparatus, in step 505, specific time information input by a user is matched with a time map to search and recover a recovery target area.

That is, according to the method of operating a digital forensic apparatus, specific time information input by a user may be matched with the time map generated in step 504 to search a recovery target area and recover the searched recovery target area.

For example, according to the method of operating a digital forensic apparatus, a user may select and search a recovery target area including a frame corresponding to a desired time, and may recover the frame in the selected recovery target area.

The present disclosure can automatically search and recover the recovery area of frames corresponding to a desired time for large-capacity video evidence using a time map generated through an optical character recognition (OCR) function.

The present disclosure can provide a recovery result quickly by selecting only a part of a space from large-capacity video evidence stored in a mass-storage device simply by inputting a desired time by a user.

The present disclosure can improve the efficiency of digital forensics by allowing a user to select a recovery target area by inputting a desired time, enabling additional confirmation of an adjacent sector based on the physical address of the selected recovery target area, and enabling additional analysis and confirmation of the relationship between time and physical arrangement.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code generated by a compiler and high-level language code executable by a computer using an interpreter and the like. The hardware devices described above may be configured to operate as one or more software modules to perform the operations of the embodiments, and vice versa.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A digital forensic apparatus for searching and recovering a recovery target area for large-capacity video evidence using a time map, comprising:
   a division recovery device for collecting video evidence from a storage device, dividing the collected video evidence into a plurality of spaces in consideration of a physical space of the storage device, and recovering a representative frame in each of the divided spaces;
   a time information recognizer for recognizing time information from the recovered representative frame using an optical character recognition (OCR) function;
   a time map generator for generating a time map in which the divided spaces are arranged according to a time criterion based on the recognized time information; and
   a selective recovery device for searching a recovery target area by matching specific time information input by a user with the generated time map and recovering the searched recovery target area,
   wherein the time map generator determines a time distribution in the physical space based on the time information and generates the time map by arranging, on a timeline, any one of the determined time distribution and physical addresses and representative frames of the divided spaces according to the time criterion corresponding to a time sequence, and
   wherein the time map generator generates, for each specific time on the timeline, the time map as a graph showing change in a number of frames comprised in a recovery area corresponding to the specific time.

2. The digital forensic apparatus according to claim 1, wherein the division recovery device divides the collected video evidence into the spaces by applying a predetermined size or ratio with respect to a total size of the physical space and recovers a first frame existing at a front in each of the divided spaces as the representative frame.

3. The digital forensic apparatus according to claim 1, wherein the time information recognizer positions a recognition box in an area corresponding to the time information in the recovered representative frame, extracts numeric features from the positioned recognition box, and recognizes the time information according to numbers classified according to the extracted numeric features.

4. The digital forensic apparatus according to claim 3, wherein the time information recognizer converts a size of an image recognized through the recognition box, normalizes pixel values of the image, extracts numeric features from the image, classifies the image numerically using the extracted numeric features, and recognizes the time information according to the extracted numeric features by performing time value verification on the classified numbers.

5. The digital forensic apparatus according to claim 3, wherein the time information recognizer classifies the recognition box by time units comprising year, month, day, hour, minute, and second and recognizes the time information according to the classified numbers in the classified time units.

6. The digital forensic apparatus according to claim 1, wherein the selective recovery device determines a list of a plurality of frames comprised in the searched recovery target area and recovers at least one frame selected from the determined list.

7. The digital forensic apparatus according to claim 1, wherein the selective recovery device provides a preview of at least one frame comprised in an adjacent sector based on a physical address of the searched recovery target area.

8. The digital forensic apparatus according to claim 1, further comprising a user interface for providing images and list of frames in the recovery target area to be recovered, providing an input interface for the specific time information, and providing a control interface for a recognition box associated with the OCR function.

9. A method of operating a digital forensic apparatus for searching and recovering a recovery target area for large-capacity video evidence using a time map, comprising:
by a division recovery device, collecting video evidence from a storage device, dividing the collected video evidence into a plurality of spaces in consideration of a physical space of the storage device, and recovering a representative frame in each of the divided spaces;
recognizing, by a time information recognizer, time information from the recovered representative frame using an optical character recognition (OCR) function;
generating, by a time map generator, a time map in which the divided spaces are arranged according to a time criterion based on the recognized time information; and
by a selective recovery device, searching a recovery target area by matching specific time information input by a user with the generated time map and recovering the searched recovery target area,
wherein the generating of a time map in which the divided spaces are arranged according to a time criterion based on the recognized time information comprises determining a time distribution in the physical space based on the time information, and generating the time map by arranging, on a timeline, any one of the determined time distribution and physical addresses and representative frames of the divided spaces according to the time criterion corresponding to a time sequence, and
wherein for each specific time on the timeline, the time map is generated as a graph showing change in a number of frames comprised in a recovery area corresponding to the specific time.

10. The method according to claim 9, wherein the dividing of the collected video evidence into a plurality of spaces in consideration of a physical space of the storage device and the recovering of a representative frame in each of the divided spaces comprises dividing the collected video evidence into the spaces by applying a predetermined size or ratio with respect to a total size of the physical space and recovering a first frame existing at a front in each of the divided spaces as the representative frame.

11. The method according to claim 9, wherein the recognizing of time information from the recovered representative frame using an optical character recognition (OCR) function comprises positioning a recognition box in an area corresponding to the time information in the recovered representative frame;
converting a size of an image recognized through the recognition box, normalizing pixel values of the image, and extracting numeric features from the image;
classifying the image numerically using the extracted numeric features; and
recognizing the time information according to the extracted numeric features by performing time value verification on a classified number.

12. The method according to claim 11, wherein the converting of a size of an image recognized through the recognition box, the normalizing of pixel values of the image, and the extracting of numeric features from the image comprise separating the recognition box by time units comprising year, month, day, hour, minute, and second, and
the recognizing of the time information according to the extracted numeric features by performing time value verification on the classified number comprises recognizing the time information according to the classified number in classified time units.

13. The method according to claim 9, wherein the searching of a recovery target area by matching specific time information input by a user with the generated time map and the recovering of the searched recovery target area comprise, by the selective recovery device, determining a list of a plurality of frames comprised in the searched recovery target area and recovering at least one frame selected from the determined list; and
providing a preview of at least one frame comprised in an adjacent sector based on a physical address of the searched recovery target area.

\* \* \* \* \*